(12) United States Patent
Kivi

(10) Patent No.: US 12,259,293 B2
(45) Date of Patent: Mar. 25, 2025

(54) DETERMINING THE CONDITION OF A STRUCTURAL PART OF A WORKING MACHINE

(71) Applicant: PONSSE OYJ, Vieremä (FI)

(72) Inventor: Aleksi Kivi, Vieremä (FI)

(73) Assignee: PONSSE OYJ, Vieremä (FI)

( * ) Notice: Subject to any disclaimer, the term of this patent is extended or adjusted under 35 U.S.C. 154(b) by 891 days.

(21) Appl. No.: 17/271,006

(22) PCT Filed: Aug. 28, 2019

(86) PCT No.: PCT/FI2019/050612
§ 371 (c)(1),
(2) Date: Feb. 24, 2021

(87) PCT Pub. No.: WO2020/043949
PCT Pub. Date: Mar. 5, 2020

(65) Prior Publication Data
US 2021/0327171 A1    Oct. 21, 2021

(30) Foreign Application Priority Data
Aug. 29, 2018    (FI) .................................... 20180097

(51) Int. Cl.
*G01M 17/00*    (2006.01)
*A01G 23/00*    (2006.01)
(Continued)

(52) U.S. Cl.
CPC ......... *G01M 17/007* (2013.01); *A01G 23/006* (2013.01); *G01M 5/0033* (2013.01); *G01M 5/0041* (2013.01)

(58) Field of Classification Search
CPC ............. G01M 17/007; G01M 5/0033; G01M 5/0041; A01G 23/006
(Continued)

(56) References Cited

U.S. PATENT DOCUMENTS 4,480,480 A    11/1984    Scott et al.
5,881,971 A    3/1999    Hickman
(Continued)

FOREIGN PATENT DOCUMENTS

CN    102459766    5/2012
CN    104603579    5/2015
(Continued)

OTHER PUBLICATIONS

Extended European Search Report issued on May 12, 2022 in corresponding European Application No. 19853591.6, 7 pages.
(Continued)

*Primary Examiner* — Aditya S Bhat
(74) *Attorney, Agent, or Firm* — Nixon & Vanderhye PC

(57) ABSTRACT

A condition of at least one structural part (11) of a working machine (10) is determined by determining a computational position of the first structural part (11') on the basis of the computational model of the working machine (10) and determining an actual position of the first structural part (11') by detecting means (22). The condition of the at least one structural part (11) is determined on the basis of the difference between the computational position of the first structural part (11') and the actual position of the first structural part (11').

14 Claims, 4 Drawing Sheets

(51) Int. Cl.
  *G01M 5/00* (2006.01)
  *G01M 17/007* (2006.01)
(58) Field of Classification Search
  USPC .......................................................... 702/113
  See application file for complete search history.

(56) References Cited

U.S. PATENT DOCUMENTS

| | | | |
|---|---|---|---|
| 8,065,037 B2* | 11/2011 | Danko | G05B 17/02 |
| | | | 91/448 |
| 8,855,943 B1 | 10/2014 | Matsui et al. | |
| 11,352,184 B2* | 6/2022 | Tsuchiya | B65D 79/0081 |
| 11,532,184 B2* | 12/2022 | Wisley | E02F 9/2045 |
| 2002/0095986 A1 | 7/2002 | Ito et al. | |
| 2004/0117095 A1 | 6/2004 | Colburn et al. | |
| 2009/0165570 A1 | 7/2009 | Bellm et al. | |
| 2009/0306909 A1 | 12/2009 | Mattes | |
| 2010/0065155 A1 | 3/2010 | Peltomae et al. | |
| 2010/0152925 A1 | 7/2010 | Goupil et al. | |
| 2014/0046614 A1 | 2/2014 | Pettersson | |
| 2015/0081229 A1 | 3/2015 | Yu et al. | |
| 2015/0088372 A1 | 3/2015 | Nower et al. | |
| 2015/0253151 A1* | 9/2015 | Inberg | B60D 1/62 |
| | | | 702/33 |
| 2015/0308933 A1 | 10/2015 | Liu et al. | |
| 2016/0097694 A1 | 4/2016 | Lysenko et al. | |
| 2017/0153625 A1 | 6/2017 | Yamamoto et al. | |
| 2018/0156696 A1 | 7/2018 | Warren et al. | |
| 2023/0235532 A1* | 7/2023 | Ishihara | G01S 19/393 |
| | | | 701/50 |

FOREIGN PATENT DOCUMENTS

| | | |
|---|---|---|
| CN | 106568605 | 4/2017 |
| DE | 20 2012 009 031 U1 | 10/2013 |
| EP | 0 074 697 | 3/1983 |
| EP | 3 144 211 | 3/2017 |
| EP | 3 318 373 | 5/2018 |
| FI | 121705 | 3/2011 |
| JP | 2001-304380 | 10/2001 |
| JP | 2002/181670 | 6/2002 |
| JP | 2011-042022 | 3/2011 |
| JP | 2012-206214 | 10/2012 |
| JP | 2015-123520 | 7/2015 |
| WO | 2006/128786 | 12/2006 |
| WO | 2010/051128 | 5/2010 |
| WO | 2016/020360 | 2/2016 |

OTHER PUBLICATIONS

May 12, 2023 Office Action issued in Russian Patent Application No. 2021106825/28(014734), pp. 1-7.
May 9, 2023 Notice of Allowance issued in Chinese Patent Application No. 201980056005.7, pp. 1-10 [machine translation included].
Sun et al., "Current Status and Development of Test and Diagnostic Technique of Transformer Winding Deformation," vol. 42, No. 4, pp. 1207-1220, Apr. 30, 2016 (see May 9, 2023 Notice of Allowance issued in Chinese Patent Application No. 201980056005.7for a concise statement of the relevance).
Dong et al., "Research on Realization Mechanism and Some Key Technologies of Smart Morphing Aircraft Structures," Apr. 20, 2010, pp. 1-186 (including English-language abstract).
Extended European Search Report issued on Apr. 29, 2022 in corresponding European Application No. 19856098.9, 7 pages.
Office Action issued on Sep. 27, 2022 in corresponding Chinese Application No. 201980056005.7 (with translation), 25 pages.
International Search Report and Written Opinion of the ISA for PCT/FI2019/050608, mailed Oct. 22, 2019, 11 pages.
Search Report for FI20180097, dated Feb. 7, 2019, 2 pages.
International Preliminary Report on Patentability with Amended Claims for PCT/FI2019/050612, completed Oct. 12, 2020, 16 pages.
Mar. 22, 2023 Office Action issued in Chinese Patent Application No. 201980056034.3 [machine translation included] pp. 1-6.
J. Xing-Jian et al., Noise and Vibration Control No. 6; Vibration Test and Analysis ofWind Turbine Towers with Cracks in Concrete Foundations; Dec. 18, 2017, pp. 168-172 [abstract included].
Office Action issued on Sep. 14, 2022 in corresponding Finnish Application No. 20180097, 4 pages.
Jun. 10, 2024 Office Action issued in European Patent Application No. 19853591.6, pp. 1-5.
Aug. 19, 2024 Office Action issued in Brazilian Patent Application No. BR112021002922-2, pp. 1-5 [partial English language translation included].
Feb. 4, 2025 Office Action issued in European Patent Application No. 19856098.9, pp. 1-8.

* cited by examiner

DETERMINING THE CONDITION OF A STRUCTURAL PART OF A WORKING MACHINE

This application is the U.S. national phase of International Application No. PCT/FI2019/050612 filed 28 Aug. 2019, which designated the U.S. and claims priority to FI patent application No. 20180097 filed 29 Aug. 2018, the entire contents of each of which are hereby incorporated by reference.

BACKGROUND

The invention relates to working machines, and more particularly to determining a condition of a structural part of a working machine.

Inspecting a condition of a working machine using the known methods has typically required clean, controlled environment and special equipment. Therefore, it has often been necessary to transport the working machine to a specific maintenance site for checking condition, such as changes in clearances and gaps in joints due to wear, of the working machine. This has meant breaks in the production, which has led to less frequent inspections to avoid maintenance breaks and financial losses. On the other hand, the less frequent inspection increase the risk of unplanned breakdowns.

BRIEF DESCRIPTION

An objective of the present invention is thus to provide a new method, arrangement, working machine and computer program product. The object is achieved by a method, arrangement, working machine and computer program product characterized by what is stated in the independent claims. Some preferred embodiments are disclosed in the dependent claims.

The invention is based on the idea of comparing an actual position or state of motion of a structural part of the working machine to a computational position or state of motion of the structural part to determine a condition of a working machine. More particularly, a computation position or state of motion is determined on the basis of a computational model, of the working machine and an actual position or state of motion is determined on the basis of information received from detecting means, and the condition is determined on the basis of the difference between the actual position or state of motion and the computational position or state of motion.

An advantage of the method and arrangement is that it enables determining the condition of the working machine practically anywhere, such as on site, and even during normal working cycle and with equipment already provided in the working machine for other purposes. This enables avoiding or minimizing maintenance breaks for this measurement purpose and, on the other hand, more frequent determining of the condition. Thereby, wear can be detected as early as possible and necessary maintenance breaks for replacing spare parts and similar can be planned well ahead. This also means that different maintenance tasks can be combined to minimize the number of maintenance breaks and risks of unplanned breaks caused by worn and/or broken parts and even risks of injury caused by them can be minimized.

BRIEF DESCRIPTION OF THE DRAWINGS

In the following the invention will be described in greater detail by means of preferred embodiments with reference to the accompanying drawings, in which.

DETAILED DESCRIPTION

Figure 1:
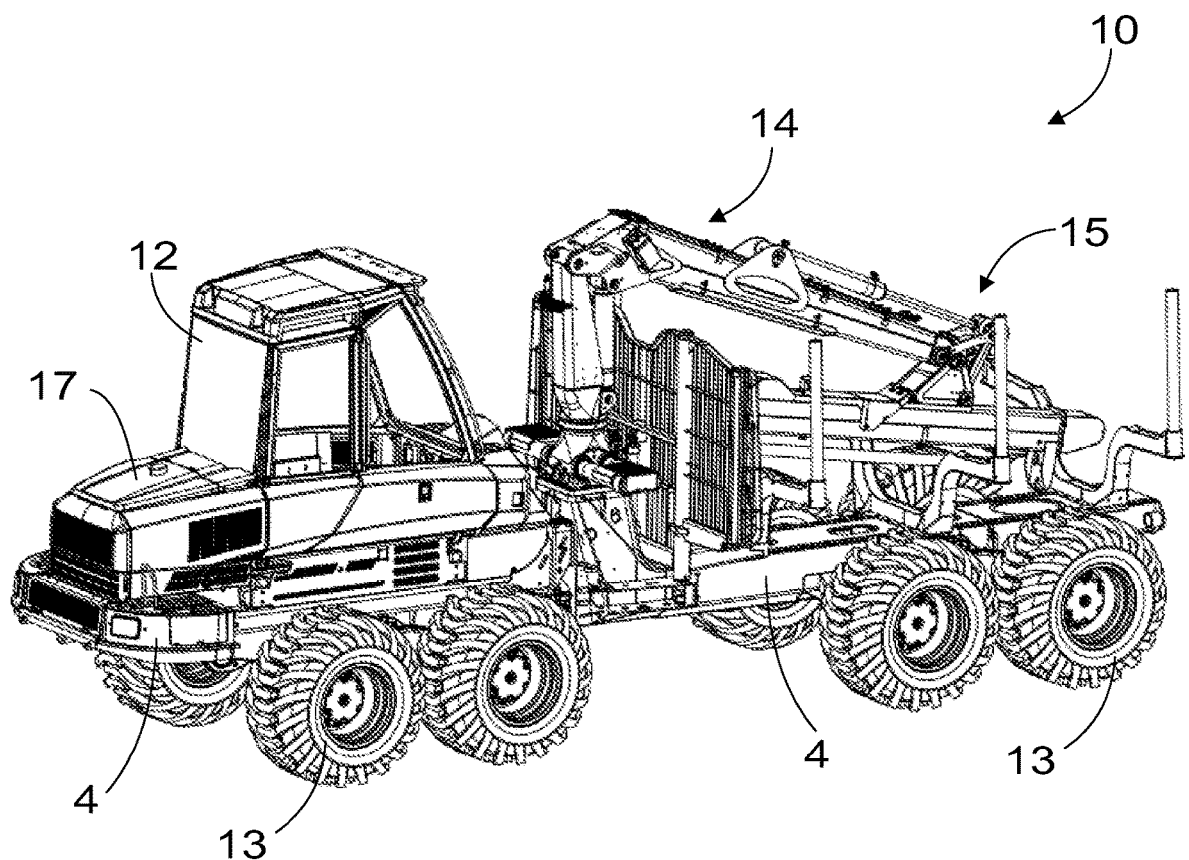
FIG. 1 illustrates a working machine.

A working machine may comprise any working machine comprising structural parts 11, such as a first structural part 11' and a second structural part 11". According to an embodiment, a first structural part 11' and a second structural part 11" may be connected to one another directly or indirectly. The first and second structural part 11', 11" being connected directly refers to the first structural part and the second structural part being connected to one another without any intermediate part or structure. The first and second structural part being connected indirectly refers to the first structural part and the second structural part being connected to one another by means of one or several other parts and/or structures, such as at least one joint, actuator, bearing, gear, connector and/or fastener.

In embodiments, where the first structural part and the second structural part are connected either directly or indirectly, the movement of the first structural part 11' and the second structural part 11" may be limited in at least one direction of movement. The direction of movement, in which the movement is limited, may be translational or rotational. According to an embodiment, the mutual movement of the first structural part and the second structural part may be limited in more than one translational and/or rotational direction of movement. The limitation may refer to the movement being completely prevented or the movement being controlled, for instance via an actuator, gear or other suitable means.

According to an embodiment, the movement of the first structural part 11' and the second structural part 11" with respect to one another in at least one direction of movement may be limited completely, whereby the first structural part and the second structural part are connected to one another fixedly in this direction of movement.

According to an embodiment, the movement of the first structural part 11' and the second structural part 11" with respect to one another in at least one direction of movement may be limited partly, whereby the movement of the first structural part with respect to the second structural part is enabled but limited in magnitude. Depending on the direction of movement in question, the magnitude may comprise a maximum angle, a maximum distance, a maximum velocity or maximum angular acceleration of the allowed mutual movement.

According to an embodiment, the first structural part 11' may be connected to the second structural part 11" by a form lock. The form lock refers to the first structural part and the second structural part or another other part or structure connecting the first structural part to the second structural part comprising a form and a counter form that, when provided against one another, limit the mutual movement of the first and the second structural parts in at least one direction of movement.

According to an embodiment, the working machine may comprise a mobile working machine. This is beneficial, as mobile working machines are typically used in environments that are not optimal for traditional ways of inspecting conditions, such as wear, gaps, clearances, deformations, distortions and/or cracks, of the working machine structural parts and joints, and/or remotely from maintenance sites and equipment. According to an embodiment, the working machine 10 may comprise a forest machine. This is particularly beneficial, as forest machines are typically used far away from maintenance sites and equipment and in conditions particularly challenging for traditional methods of inspecting wear, gaps, clearances, deformations, distortions and/or cracks and other similar conditions of the working machine 10. A deformation can be elastic or plastic.

FIG. 1 illustrates a working machine 10. The work machine in FIG. 1 is a forest machine, more particularly a forwarder. However, the present solution is applicable for other types working machines, like other types of forest machines, such as harvesters, as well as mobile working machines and other types of working machines too, like lifting machines, timber transporters and other types of machines or vehicles equipped with booms or other types of work implements, like the mining or construction machines, and the forwarder is shown to illustrate typical structural parts and principles of a (mobile) working machine only.

A working machine 10 may comprise one, two or more frame parts 4. A working machine may also comprise a cabin 12 arranged in at least one of the frame parts 4. Furthermore, a working machine 10, more particularly a mobile working machine, may comprise moving equipment 13. The moving equipment 13 may comprise at least one of the following: wheels, continuous tracks and other moving elements for moving a working machine with respect to ground or other working platform known as such. According to an embodiment, the working machine 10 may also comprise a boom 14. In the embodiment of FIG. 1, the working machine 10 further comprises other structural parts 11, such as a load space 15, a tool (not shown), such as a harvester head or a grapple, and a power source 17. It is clear for a person skilled in the art that all the parts and equipment of the working machine 10 mentioned may be considered as structural parts 11 of the working machine, as well as any other structural parts of the working machine 10 not mentioned particularly.

Figure 2:
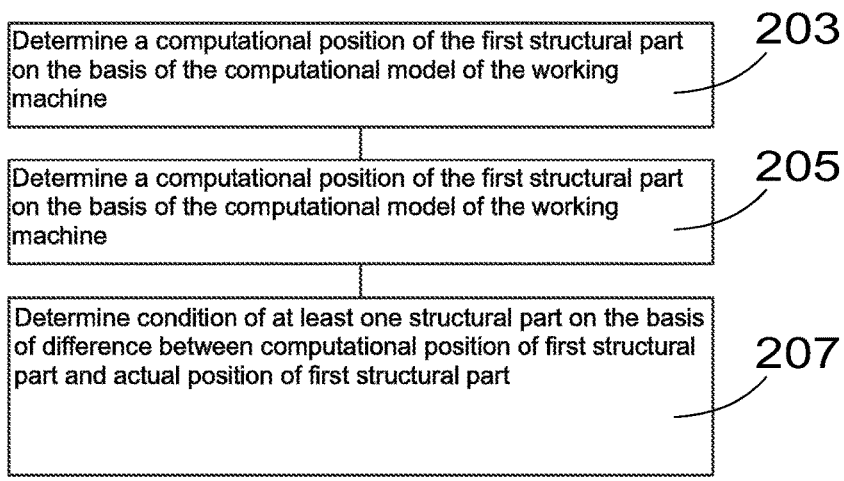
FIG. 2 illustrates a method for determining a condition of at least one structural part of a working machine.

FIG. 2 illustrates a method of determining a condition of at least one structural part 11 of a working machine 10. The method may comprise determining 203 a computational position or state of motion of the first structural part 11' on the basis of the computational model of the working machine. The computational position or state of motion of the first structural part 11' refers to the intended position or state of motion, in which the first structural part 11' should be provided on the basis of the computational model of the working machine, for instance the intended position or state of motion, in which the first structural part 11' should be provided on the basis of the computational model of the working machine as a result of controlling position or state of motion of the first structural part, such as controlling the first structural part 11' of the working machine to move, stay in place or maintain its current state of motion. The computational position or state of motion is, thus, determined by data processing means, such as by data processing means 23 of the control system 2 and/or data processing equipment external to the working machine 10, on the basis of the computational model of the working machine without actual measurements directed to the first structural part 11' at the time of the determination of the computational position or state of motion.

The data processing means may, for instance, be configured to retrieve the computational model from a memory, such as a memory of the working machine, a memory of the terminal device or a memory provided at a remote location, and execute product program code provided on a computer readable medium to determine the computational position or state of motion of the first structural part 11' and/or to determine the condition of at least one structural part of the working machine.

The computational model may comprise for instance a design model or a model built on the basis of measurements made during intended use of the working machine, while the condition of the structural parts has been known to be adequate.

According to an embodiment, the method comprises controlling the position or state of motion of the first structural part 11'. The position or state of motion of the first structural part may be controlled relative to a second structural part 11" of the working machine and/or relative to the surroundings of the working machine 10, such as the ground.

According to an embodiment, the first structural part 11' may be controlled to maintain its current position and/or state of motion. In other words, the first structural part 11' may be controlled to stay in place or maintain its current state of motion. According to another embodiment, controlling the position or state of motion of the first structural part may comprise arranging the first structural part 11' of the working machine to move. The first structural part 11' may arranged to move relative to a second structural part 11" of the working machine and/or relative to the surroundings of the working machine 10, such as the ground and/or the gravity vector. The gravity vector refers to an acceleration vector caused by gravity, shown by arrow D in FIG. 5.

The first structural part 11' may be controlled to move for instance in response to providing a control command, such as a command to move, provided by a control system 2 of the working machine. Similarly, the first structural part 11' may be controlled to maintain its position or state of motion either by a control command or absence of a (new) control command. The control command may be based on an operator using a user interface 3 and/or an automatic control provided by the control system controlling the operation of the working machine 10. According to an embodiment, the operator and/or the control system may control the working machine 10 remotely via remote connection, such as a teleconnection. According to an embodiment, the control system may provide such an automatic control as a part of a work cycle of the working machine 10. In other words, one, multiple or all of the method steps may be executed in the working machine, in a remote location, and/or in a terminal device provided in the working machine, in the vicinity of the working machine and/or in a location remote from the working machine, for example. The steps may also be distributed between different devices, such that some of the data and/or equipment is provided in a first device, such as the working machine, and some of the data and/or equipment is provided in a second device. The control system 2 may comprise data processing means 23. The data processing means 23 may comprise a controller and/or a data processor.

According to an embodiment, the computational position or state of motion of the first structural part 11' on the basis of the computational model of the working machine may comprise the intended position or state of motion of the first structural part 11', in which the first structural part 11' should be provided in response to the control command provided by the control system 2 considering a start position or state of motion of the first structural part 11', the control command provided by the control system 2 and the computational model of the working machine. The computational model of the working machine refers to a model created using an engineering tool, such as a CAD, 3D CAD or CAE tool or similar, and comprising information about the geometrics, kinetics and other similar characteristics of the working machine 10. According to an embodiment, the computational model comprises information about at least one of the following: a geometry of the working machine, a weight of at least one structural part of the working machine, and a kinetic model of the working machine. A kinetic model of the working machine may comprise, among other things, information about dimensions, physical properties, material characteristics and information about the way the structural parts are arranged in relation to one another, as well as information about elasticity and/or deformation of structural parts, actuator, or hydraulic components.

According to an embodiment, the computational position or state of motion of the first structural part 11' and the actual position or state of motion of the first structural part 11' may be determined relative to a predetermined coordinate system. According to another embodiment, the computational position or state of motion of the first structural part 11' and the actual position or state of motion of the first structural part 11' may be determined relative to a start position or state of motion of the first structural part 11'. The start position or state of motion refers to the position or state of motion of the first structural part 11' before the control of the first structural part 11', such as the control to move the first structural part 11'.

The method may further comprise determining 205 an actual position of the first structural part 11' by detecting means 22. The actual position or state of motion of the first structural part 11' refers to the actual position or state of motion the first structural part 11' is provided at the time of the determination, for instance as a result of controlling position or state of motion of the first structural part, such as controlling the first structural part 11' of the working machine to move, to stay in place or maintain its current state of motion. The actual position or state of motion is, thus, determined on the basis of data received from the detecting means 22 at the time of the arranged movement or after the arranged movement has taken place. According to an embodiment, the detecting means 22 may comprise at least one detector. According to an embodiment, the detecting means may comprise at least one of the following: an inclinometer, an acceleration sensor, an angular acceleration sensor, a gyroscope, an inertial measurement unit, a joint angle sensor, a linear position meter, an angular position meter, a position sensor of a pressure medium sensor, such as a position sensor of a hydraulic cylinder, a radar and an optical sensor, such as a LiDAR (Light Detection and Ranging) or camera. The actual position or state of motion of the first structural part 11' may be determined by detecting means 22 for instance by sensing, measuring and/or calculating the position or state of motion. According to an embodiment, the data processing means 23 may also be involved in the determining of the actual position or state of motion.

The actual and computational position of the first structural part 11' may comprise for instance a location and/or orientation of the first structural part 11'. The actual and/or computational state of motion of the first structural part 11' may comprise for instance the velocity, the acceleration, angular velocity and/or angular acceleration of the first structural part. Depending on the embodiment, the actual position or state of motion and the computational position or state of motion of the first structural part 11' may be determined relative to a second structural part 11" of the working machine, relative to the surroundings of the working machine 10, such as the ground and/or the gravity vector, relative to the start position or state of motion of the first structural part 11' before the arranged movement, and/or relative to a predetermined coordinate system.

The method may further comprise determining 207 the condition of the at least one structural part 11 on the basis of the difference between the computational position or state of motion of the first structural part 11' and the actual position or state of motion of the first structural part 11'. In other words, the condition may be determined on the basis of the actual position or state of motion of the first structural part 11' being different than the computational position or state of motion of the first structural part 11'. This is based on conditions, such as wear, gaps, clearances, deformations, distortions and/or cracks in the first structural part 11', the second structural part 11" and/or a structural part 16 connecting the first and second structural parts 11', 11" to one another causing the first structural part 11' being provided in an actual position or state of motion different from the intended position or state of motion, in other words the computational position or state of motion.

According to an embodiment, the condition of the at least one structural part 11 may be determined by a one-time measurement, in other words by measuring the actual position or state of motion of the first structural part 11' at a given time instant after an arranged movement of the first structural part 11', calculating the computational position or state of motion of the first structural part 11' on the basis of the computational model and comparing these positions or states of motion. In such an embodiment, the condition of the at least one structural part 11 may be determined to be acceptable, if the difference between the actual position or state of motion and the computation position or state of motion of the first structural part 11' is within a predetermined threshold. Similarly, the condition may be determined to trigger at least an action, if the difference between the actual position or state of motion and the computation position or state of motion of the first structural part 11' exceeds a predetermined threshold.

According to further embodiment, the condition of the at least one structural part 11 may be determined repeatedly, either occasionally or regularly. This enables comparing values of the difference between the actual position or state of motion and the computation position or state of motion of the first structural part 11' at different time instants to find an increase or decrease in the values reflecting the condition of the at least one structural part 11. This is beneficial, as systematic errors in the measurements can be detected and filtered from the results and threshold values and trends can be used to detect changes in the condition over time. According to an embodiment, the difference between the actual position or state of motion and the computation position or state of motion of the first structural part 11' may be determined at least at one and preferably at least at two of the following time instants: when a new working machine is taken into use, after maintenance of the working machine, at the beginning of a new work shift and at a predetermined time interval from at least one of the previously mentioned time instants.

According to an embodiment, the condition may be determined automatically. In other words, the control system 2 may determine the at least one time instant at which the condition is determined. According to another embodiment, the condition may be determined in response to an action of the operator, such as in response to the operator initiating the determination of the condition using the user interface 3.

According to an embodiment, the control system 2 may be arranged to trigger an action in response to at least one criteria for the condition being fulfilled. Such a criteria may comprise for instance setting a control limit, such as a threshold, for the difference between the actual position or state of motion and the computation position or state of motion of the first structural part 11'. Exceeding the predetermined threshold and/or a trend of the difference between the actual position or state of motion and the computation position or state of motion of the first structural part 11' determined from a plurality of time instants meeting a predetermined criteria, such as a predetermined number of decreasing or increasing values or other similar criteria known in the art, may be arranged to trigger an action. According to an embodiment, the action triggered may comprise at least one of the following: providing an alert to the operator, for instance on a display or as an audio alert, affecting the operation of the working machine by the control system 2, for instance slowing down the process, limiting or inhibiting some functions, extreme positions and/or loads handled to prevent hazards caused to the operator, the working machine, the material being processed and/or the working environment, or even stopping the working machine in case of increased risks.

The condition may be determined for the first structural part 11', a second structural part 11", or a structural part 16 connecting the first and second structural parts 11', 11" to one another. Each of the first structural part 11' and the second structural part 11" may comprise at least one of the following or a part thereof: a frame part 11, a cabin 12, a piece of moving equipment 13, a boom 14, a boom section, a load space 15, a tool and a power source 17. Each of the first structural part 11' and the second structural part 11" may also comprise in addition to or instead of the above mentioned structural parts any other structural part of the working machine 10 known as such.

According to an embodiment, the first structural 11' part may be arranged to move by moving means 5, such as at least one actuator (not shown) of the working machine 10. Actuators for moving structural parts of working machines are well known in the art and may comprise, for instance, a hydraulic actuator, a pneumatic actuator, an electric actuator or an actuator driven by any other suitable manner. The actuator may comprise for instance a motor or a pressure fluid cylinder. According to a further embodiment, the moving means 5, such as an actuator, may be external to the working machine and, thus, be driven by a power source external to the working machine 10. In some embodiments, the first structural part 11' may not comprise moving means at all. Such a first structural part 11' may or may not be designed, for instance articulated, to move relative to other structural part(s) of the working machine.

According to an embodiment, the computational position or state of motion, the actual position or state of motion of the first structural part 11' may be determined relative to a second structural part 11". In such an embodiment, the first structural part 11', the second structural part 11" or both structural parts may be provided with detecting means 22. According to a further embodiment, the detecting means 22 may be provided in a further structural part 11 of the working machine other that the first or the second structural part, for instance if the detecting means 22 comprise a distance detecting sensor, such as a radar or an optical sensor.

The computational and/or actual position or state of motion of the first structural part 11' relative to the second structural part 11" may then be determined either by directly determining the mutual position or state of motion of the structural parts, for instance by a detector detecting a distance and/or an angle between the structural parts, or by determining the actual positions or states of motion of both structural parts 11', 11" and determining the position or state of motion of the first structural part 11' relative to the second structural part 11" on the basis of the determined positions or states of motion of the structural parts 11', 11".

According to an embodiment, a start position or state of motion of the first structural part 11' relative to the second structural part 11" may be used as a reference position or state of motion. The actual position or state of motion of the first structural part 11' relative to the second structural part 11" after the movement may be determined with respect to that reference position or state of motion, or by detecting the change in the actual position or state of motion of the first structural part 11' relative to second structural part 11" in some other way known as such, such as by a sensor sensing a change in a distance or angle between the first and second structural parts 11', 11". Similarly, the computational position or state of motion of the first structural part 11' may be determined relative to the reference position or state of motion, in other words the start position or state of motion of the first structural part 11' relative to the second structural part 11".

The position or state of motion of the first structural part 11' with respect to the second structural part 11" refers to mutual translational and/or rotational position or state of motion of the first and second structural parts 11', 11". In other words, one or both of the first and second structural parts 11', 11" may rotate or move in a translational direction with respect to the other.

In other words, in the method, arrangement, working machine and/or computer program product of this description a first structural part 11' of a working machine 10 is arranged to move and the computational position or state of motion and the actual position or state of motion of the first structural part 11' after the movement are determined. The condition of at least one structural part 11', 11", 16 of the working machine 10 is then determined on the basis of the difference between the actual position or state of motion and the computational position or state of motion of the first structural part 11'.

According to an embodiment, the condition is determined for the first structural part 11'. In other words, in the method, arrangement and computer program product, the condition of the structural part for which the computational position or state of motion and the actual position or state of motion are determined, may be determined. According to another embodiment, in the method, arrangement and computer program product, the condition is determined for a second structural part 11" that is different from but arranged in connection with the first structural part 11'. Depending on the embodiment, the first structural part 11' and the second structural part 11" may be connected directly or indirectly, as explained above. According to a further embodiment, the condition is determined for a structural part 16 connecting at least two structural parts of the working machine, the first structural part 11' and the second structural part 11".

According to an embodiment, the condition is determined for a joint connecting at least two structural parts 11, 11', 11", 16 of the working machine. According to an embodiment, the first structural part 11' may comprise the joint. According to another embodiment, the first structural part 11' may comprise at least one of the structural parts 11, 11', 11", 16 connected to one another by the joint.

According to an embodiment, the condition of the at least one structural part 11', 11", 16 may comprise wear of the structural part. According to an embodiment, the wear of the at least one structural part 11', 11", 16 may comprise change in the clearance or gap in the connection between the first and the second structural parts 11', 11".

According to an embodiment, determining the condition of at least one structural part may comprise determining at least one of the following: a clearance of a structural part, a clearance of a joint of two structural parts, a deformation of a structural part, a deformation of a joint of two structural parts, a flex of at least one structural part, a crack in at least one structural part and a leakage of a structural part.

A clearance or a gap may comprise for instance an axial bearing clearance, an actuator clearance, a transmission clearance and/or a mechanical clearance. The axial bearing clearance may comprise for instance a clearance in a joint or a telescopic mechanism. The actuator clearance may comprise for instance clearance in the actuator mounting means, for instance in the dimension of a mounting bracket, or a clearance in the dimensions of the actuator itself. The transmission clearance may comprise for instance a clearance in dimensions of a toothed transmission or other type of form-based transmission device. The mechanical clearance may comprise for instance a clearance in dimensions of a locking mechanism or mounting mechanism.

A leakage may comprise a leakage of pressure medium via a seal, a damaged hose, a damaged pressure medium line, a valve or other component of the pressure medium system, the wear, deterioration or failure of which may cause a leakage affecting the operation of the first structural part 11'.

Figure 6:
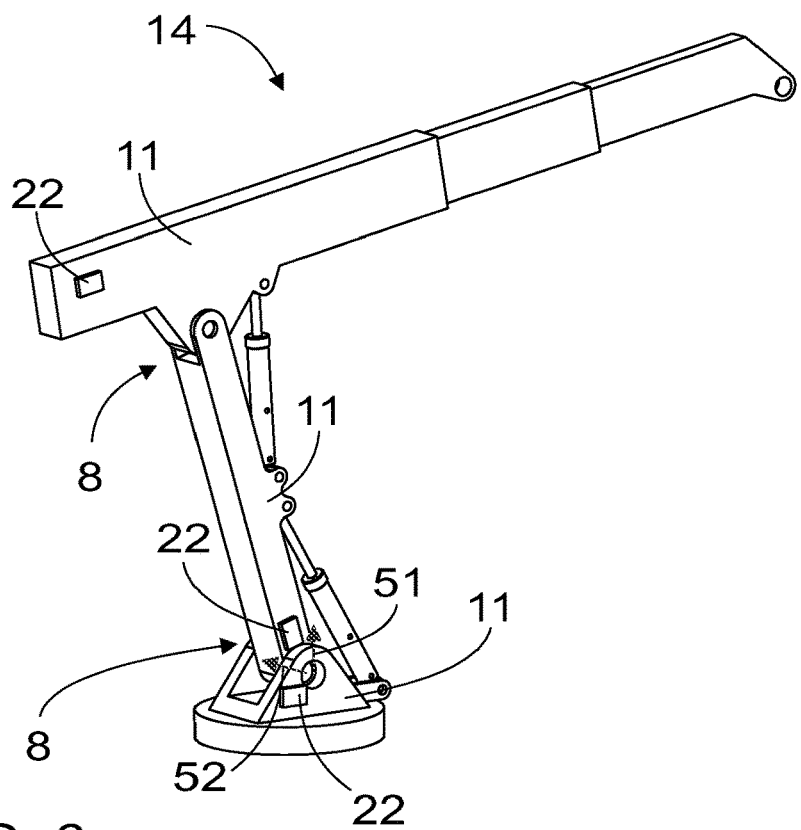
FIG. 6 illustrates schematically a boom of a working machine.

FIG. 6 illustrates schematically a boom of a working machine. FIG. 6 also illustrates a joint 8, more particularly two joints 8, and different types of clearance or gap in connection with such a joint. FIG. 6 illustrates the directions of a radial clearance 51 and axial clearance 52. FIG. 6 also illustrates an embodiment of providing detecting means 22 in at least two structural parts 11, more particularly in three structural parts 11. In such an embodiment, either one of the structural parts 11 provided with the detecting means 22 may comprise the first structural part 11', and one of the other structural parts 11 may comprise the second structural part 11". The detecting means 22 may comprise an inertia sensor, for example. The inertia sensor may comprise for instance an inertia measurement unit, for example Inertia Measurement Unit made by MEMS-technology. The detecting means 22 may also comprise some other type of detecting means disclosed in this description.

According to an embodiment, the actual position or state of motion of the first structural part 11' may be determined directly, for instance relative to working platform or to the ground, the gravity vector or a predetermined coordinate system. According to another embodiment, the actual position or state of motion of the first structural part 11' may be determined relative to a second structural parts 11".

According to an embodiment, the actual position or state of motion of the first structural part 11' may be determined by determining at least in one direction of measurement at least two different measured variables, a first and a second measured variable; receiving a first and a second measurement signal describing the first and the second measured variable in data processing means; and determining the actual position or state of motion of the first structural part on the basis of the first and the second measured variable.

Determining at least the two different measured variables for a direction of measurement and for a structural part enables using average values from the measurements and/or measurement errors occurring in a single measured variable and caused by various disturbances to be compensated for quickly and accurately. In such a case, by combining the signals of the acceleration sensor and/or an inclinometer and/or the angular velocity sensor and/or the angular acceleration sensor in order to compensate for the measurement errors it is possible to calculate the actual position or state of motion of the structural part in a reliable manner. Such compensation is known per se and thus does not need to be explained in closer detail herein. The use of these detectors provides for instance the advantage that the position or state of motion information may be determined by small, inexpensive, reliable and long-lasting detectors, which may often also be arranged quite freely in the structural part being monitored. In comparison with the present solutions, durable articulation angle sensors and linear position sensors, for instance, are expensive.

According to an embodiment, the actual position or state of motion of the first structural part 11' is determined by at least one of the following: an inclinometer, an acceleration sensor, an angular acceleration sensor, a gyroscope, a magnetometer, a capacitive distance sensor, an inertial measurement unit, a linear position meter, an angular position meter, a joint angle sensor, a position sensor of a pressure medium sensor, such as a position sensor of a hydraulic cylinder, a radar and an optical sensor, such as a LiDAR (Light Detection and Ranging) or camera.

According to an embodiment, the first and/or the second measurement signal may comprise at least one of the signals of the following: an inclinometer, an acceleration sensor, an angular acceleration sensor, a gyroscope, a magnetometer, a capacitive distance sensor, an inertial measurement unit, a linear position meter, an angular position meter, a joint angle sensor, a position sensor of a pressure medium sensor, such as a position sensor of a hydraulic cylinder, a radar and an optical sensor, such as a LiDAR (Light Detection and Ranging) or camera.

According to an embodiment, a predetermined time interval for determining the condition of the at least one structural part may be set.

According to an embodiment, the condition of the at least one structural part 11', 11", 16 may be determined automatically during normal use of the working machine 10, for instance at the predetermined time interval. This is particularly beneficial, as the normal use of the working machine does not need to be interrupted and no active actions are needed from the operator of the working machine. This makes it easier to continuously monitor the condition of the working machine and enables detecting early signs of wear, for example, giving more time and alternatives for planning maintenance actions. In such an embodiment, the determination of the condition of at least one structural part may be implemented in connection with movements that belong to the normal use, for instance normal work cycles, of the working machine 10. In other words movements of the first structural part 11' related to implementing other functions of the working machine, may be used for determining the condition of the at least one structural part. According to another embodiment, data processing means of the working machine may be arranged to give an alert or a reminder to the operator at predetermined time intervals to determine the condition. Depending on the embodiment, the operator may comprise for instance an owner, a maintenance person, a driver or a manager of the working machine.

According to an embodiment, the determining of the computational position or state of motion, the actual position or state of motion and the condition of at least one structural part may be made during testing and/or normal production use of the working machine, for instance continuously or at predetermined time intervals. If for instance a boom or crane moves, such as swings or moves downwards, while no control command has been given for the working machine to move the boom or the crane, especially if this movement exceeds a predetermined threshold, the condition of for instance the boom, a joint of the boom or the hydraulic system controlling the boom may be determined to be deteriorated.

According to an embodiment, the actual position or state of motion of the first structural part 11' may be determined to correlate with the computational position or state of motion according to the computational model. On the basis of this information, the condition of at least one structural part, such as the first structural part 11', a joint connecting the first structural part 11' to a second structural part 11" or some other structural part of the working machine may be determined to be adequate.

According to an embodiment, the actual position or state of motion of the first structural part 11' may be determined to differ from the computational position or state of motion according to the computational model an amount exceeding a predetermined threshold. On the basis of this information, the condition of at least one structural part, such as the first structural part 11', a joint connecting the first structural part 11' to a second structural part 11" or some other structural part of the working machine may be determined to be inadequate. In other words, the difference between the actual and computational position or state of motion may be interpreted to indicate an unideal state of the structural part, the condition of which is being determined, and the difference exceeding a predetermined limit value may be determined to indicate a condition of the structural part triggering an action.

For instance, a control command may be given for the first structural part 11' to move to a certain direction, but the actual position or state of motion of the first structural part 11', such as the position or the velocity of the first structural part 11', may not correlate to the computational position or state of motion of the first structural part 11'.

Or a toothed transmission, driven for instance by a cylinder, may be controlled to move the first structural part 11', but the position or state of motion of the first structural part 11', in other words the actual position or state of motion of the first structural part 11', may be determined to be different from the computational position or state of motion, such as a computational velocity or orientation of the first structural part 11'. For instance, the actual position or state of motion of the first structural part 11' may be determined by the detecting means to be maintained the same, although the cylinder is detected to start moving and/or a movement of the first structural part 11' may be determined to continue while it is controlled to maintain its position. On the basis of this information, it may be determined that the condition of the toothed transmission is deteriorated. This may comprise for instance a tooth of the toothed transmission being deformed or a clearance changed due to wear or similar.

According to an embodiment, such action triggered by the determined condition of the structural part may comprise giving a notification for the operator, providing a sound or visual alarm, slowing down or stopping the movement of the structural part or some other structural part or function of the working machine, preventing the movement and/or use of the working machine altogether. According to an embodiment, several limit values or thresholds may be predetermined correlating to conditions of different severity, whereby the action selected to be triggered may be determined to depend on the severity, such as the magnitude of the difference between the actual and computational position or state of motion.

Figure 3:
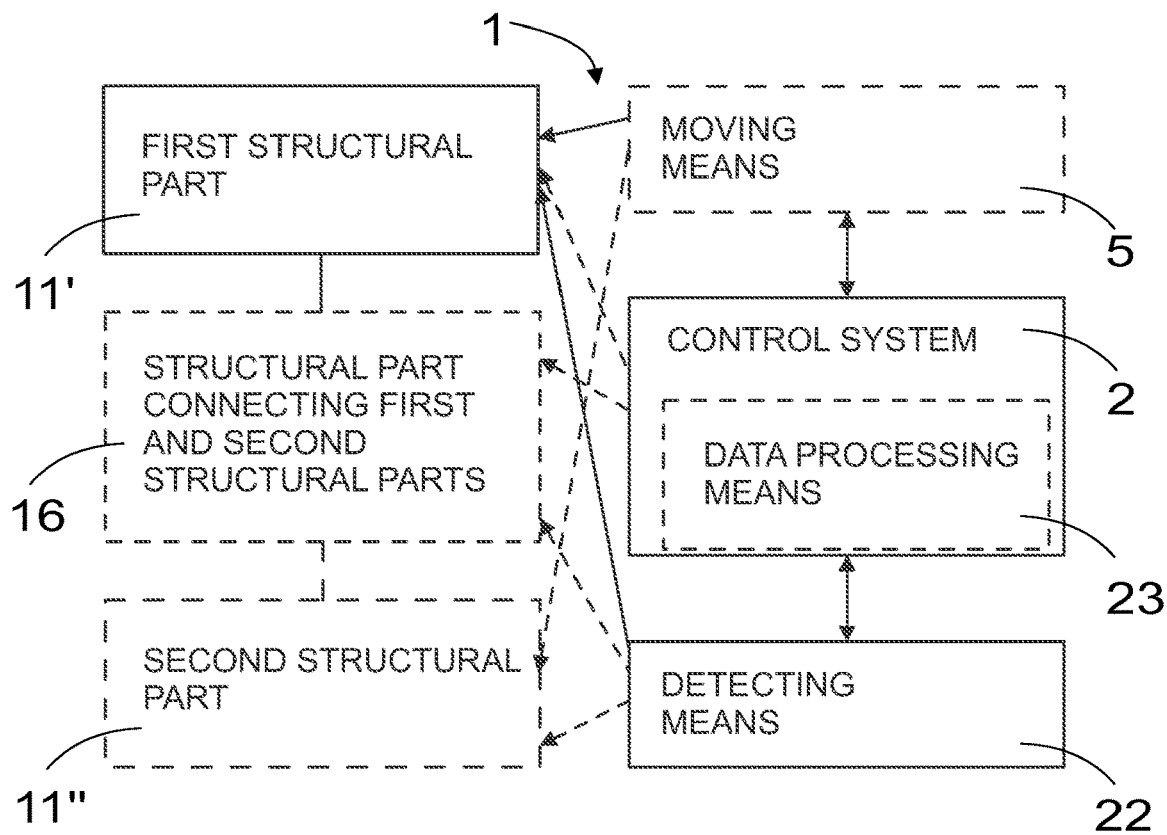
FIG. 3 illustrates an arrangement 1 for determining a condition of at least one structural part of a working machine.

FIG. 3 illustrates an arrangement 1 for determining a condition of at least one structural part 11', 11", 16 of a working machine 10.

The arrangement 1 may comprise moving means 5 arranged to move a first structural part 11' of the working machine. The position or state of motion of the first structural part 11' may be controlled. According to an embodiment, the first structural part 11' may be controlled to maintain its current position or state of motion and according to another embodiment the first structural part 11' may controlled to move relative to a second structural part 11" of the working machine and/or relative to the surroundings of the working machine 10, such as the ground and/or the gravity vector. The first structural part 11' may be controlled, for instance controlled to move, for instance in response to providing a control command provided by a control system 2 of the working machine, or in the case of maintaining its position or state of motion possibly also in response to the absence of a control command. The control command may be based on an operator using a user interface 3 and/or an automatic control provided by the control system controlling the operation of the working machine 10. According to an embodiment, the operator and/or the control system may control the working machine 10 remotely via remote connection, such as a teleconnection. According to an embodiment, the control system may provide such an automatic control as a part of a work cycle of the working machine 10. The control system 2 may comprise data processing means 23.

The arrangement 1 may further comprise detecting means 22 arranged to determine an actual position or state of motion of the first structural part 11'. The actual position or state of motion of the first structural part 11' is explained in more detail in connection with the description related to the method of FIG. 2.

The arrangement 1 may further comprise data processing means 23 arranged to determine a computational position or state of motion of the first structural part 11' on the basis of the computational model of the working machine. According to an embodiment, the data processing means 23 may comprise data processing means of a control system 2, such as a control system of the working machine 10. The computational position or state of motion of the first structural part 11' and the computational model of the working machine are explained in more detail in connection with the description related to the method of FIG. 2.

The data processing means 23 may further be arranged to determine the condition of the at least one structural part on the basis of the difference between the computational position or state of motion of the first structural part and the actual position or state of motion of the first structural part. The determining of the condition of the at least one structural part 11 is explained in more detail in connection with the description related to the method of FIG. 2.

According to an embodiment, the moving means 5 may comprise an actuator of the working machine.

According to an embodiment, the detecting means 22 may be arranged fixedly to the working machine 10. According to another embodiment, the detecting means may comprise detecting means releasably connectable to the working machine 10 and the data processing means 23.

The arrangement 1 may comprise detecting means 22 arranged to determine an actual position or state of motion of the first structural part 11' of the working machine 10. The detecting means may comprise at least one detector, for example.

According to an embodiment, the arrangement 1 may further comprise a user interface 3 enabling an operator to affect the working machine 10, for instance through the control system 2 of the working machine 10. The user interface 3 may comprise a physical user interface, in other words buttons, levels, keyboards and/or other types of physical equipment enabling the operator to affect the working machine 10, a graphical user interface, such as a display, touch screen or some other type of a graphical user interface, or a combination thereof.

According to an embodiment, the detecting means may be arranged fixedly to the working machine. According to another embodiment, the detecting means comprise detecting means releasably connectable to the working machine and the data processing means.

According to an embodiment, a working machine may comprise an arrangement described above and/or be arranged to implement at least one of the steps of a method described above.

Figure 4:
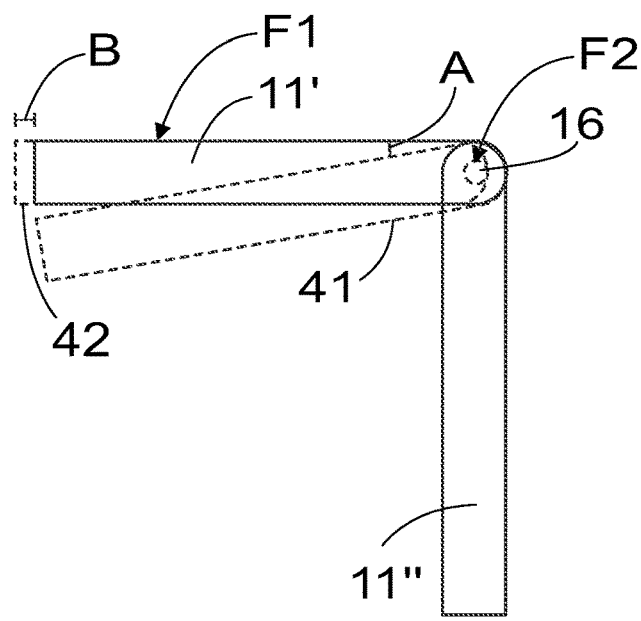
FIG. 4 illustrates schematically a first structural part and a second structural part of a working machine.

FIG. 4 illustrates schematically a first structural part 11' and a second structural part 11" of a working machine 10 and some basic concepts of the arrangement and method described above. According to an embodiment, the first structural part 11' and the second structural part 11" may be connected to one another by a structural part 16 connecting the first and second structural parts 11', 11" to one another. This optional structural part 16 connecting the first and second structural parts is shown in the FIG. 4 by a dashed line.

According to an embodiment, the difference between the actual position of the first structural part 11' and the computational position of the first structural part 11' may comprise a rotational difference, such as a difference of an angle A in the FIG. 4, when the actual position of the first structural part 11' with respect to the computational position of the first structural part 11' is shown by a first dashed line 41. According to a second embodiment, the difference between the actual position and the computational position of the first structural part 11' may comprise a lateral difference, such as the difference of a distance B in the FIG. 4, when the actual position of the first structural part 11' with respect to the computational position of the first structural part 11' is shown by a second dashed line 42. According to a third embodiment, the difference between the actual position and the computational position of the first structural part 11' may comprise a combination of a rotational difference and a lateral difference.

A control limit, such as a threshold, the trend or other criteria for the condition may similarly be set for one or both of the types of the difference between the actual and computational positions or state of motion, namely lateral or rotational. The difference may also take place in a direction other than an intended direction of movement. For instance, the difference in the position and/or state of motion of the first structural part 11', either rotational or lateral, may take place in the direction of the intended rotation or linear movement or in a direction transverse to that direction.

Figure 5:
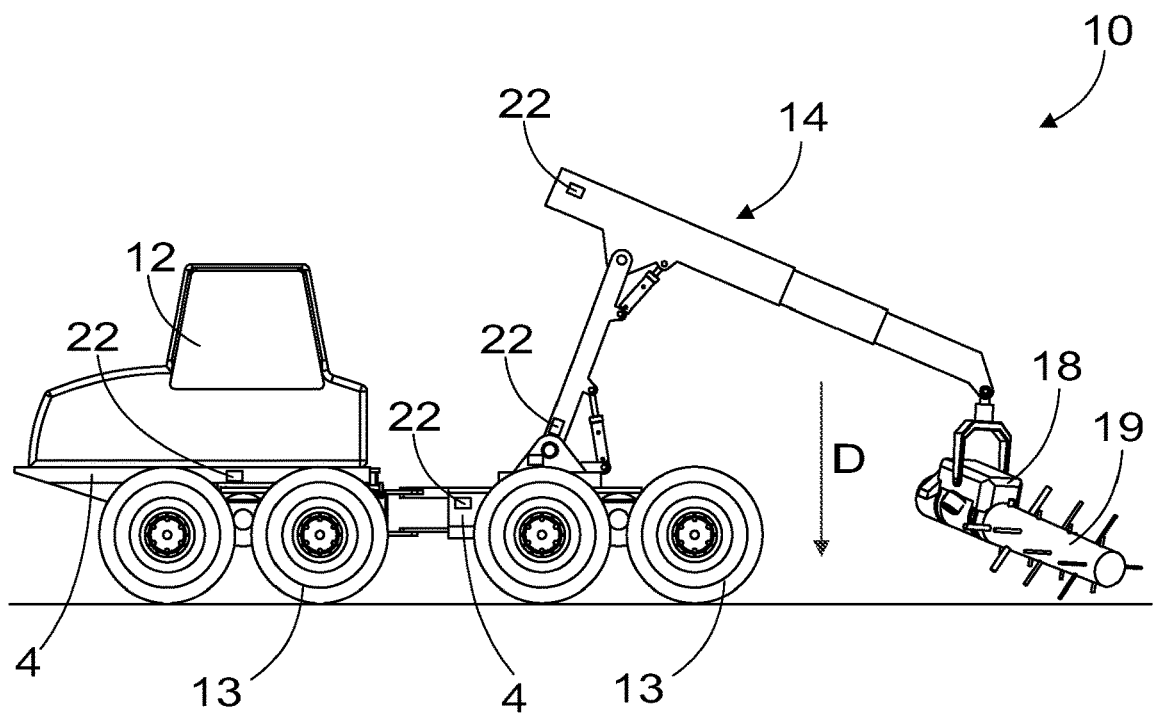
FIG. 5 illustrates an embodiment of a working machine.

FIG. 5 illustrates an embodiment of a working machine 10. In the embodiment of FIG. 5, the working machine 10 is a harvester. In FIG. 5, some of the structural parts of the working machine 10 are marked with reference numbers. Many of these structural parts may comprise structural parts similar to the working machine 10 of FIG. 1. On the other hand, the working machine 10 may also comprise structural parts different from the structural parts embodiment of FIG. 1 instead of or in addition to the structural parts described in connection with FIG. 1 and other embodiments described in this description. The working machine 10 may, for instance, comprise a tool 18, such as a harvester head. In FIG. 5, the harvester head is shown holding a trunk 19.

FIG. 5 also illustrates detecting means 22 provided in the working machine 10. The detecting means 22 shown in FIG. 5 only illustrate one embodiment and in different embodiments, a working machine 10 may comprise none, one, two or more than two of the detecting means 22 of FIG. 5 and/or one, two or multiple pieces of detecting means 22 not shown in FIG. 5. In the embodiment of FIG. 5, detecting means 22 are provided in two frame parts 11 and two boom sections of boom 14. According to another embodiments, detecting means 22 may be provided for instance in the cabin 12, a further boom section, the tool 18 and/or at least one other structural part of the working machine 10.

Figure 7:
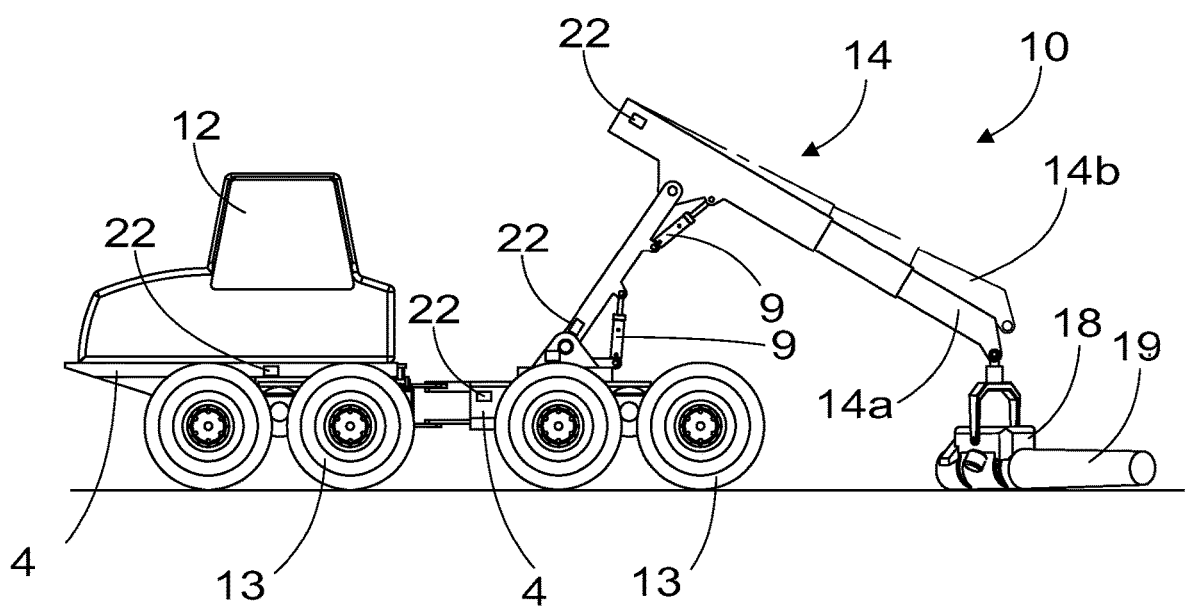
FIG. 7 illustrates schematically an embodiment of a working machine and a difference between a computational position or state of motion and an actual position or state of motion of a boom of the working machine.

FIG. 7 illustrates schematically an embodiment of a working machine 10 and a difference between an actual position and a computational position of the first structural part 11', more particularly an outer section of a boom 14, of the working machine 10. FIG. 7 illustrates schematically the difference between the actual position and the computational position of the first structural part, more particularly the outer section of the boom 14, by showing the actual position of the outer section of the boom by reference 14a and a computational position of the outer section of the boom by reference 14b. Thereby, the difference between the actual position and the computational position of the outer section of the boom 14 comprises the difference between these positions. The position of the first structural part 11' may refer to the position of the first structural part 11' with respect to a second structural part 11". In the embodiment of FIG. 7, the second structural part 11" may comprise the inner section of the boom 14, in other words the section of the boom 14 articulated to a frame part 11, or the frame part 11, for example. The actual position of the first structural part 11' may be detected by the detecting means 22, for example. In the embodiment of FIG. 7, the trunk 19 is laid against the ground in the actual position of the boom, for example.

Data processing means 23 (not shown) may be arranged to determine the condition of at least one structural part of the working machine, such as the outer section of the boom 14, the joint articulating the outer section of the boom 14 to the inner section of the boom 14 or the frame part 11, or the joint connecting the boom 14 to the frame part 11. The condition may be determined on the basis of the difference between the actual and computational positions or states of motion of the first structural part.

A computer program product may be in storage on a computer readable medium and executable with a processor. The computer program product may comprise a computer readable program code, which is arranged to carry out steps of a method as set forth above or a combination thereof, as the program code is being executed with the processor. The processor may comprise the data processing means of the working machine.

It will be obvious to a person skilled in the art that, as the technology advances, the inventive concept can be implemented in various ways. The invention and its embodiments are not limited to the examples described above but may vary within the scope of the claims.

The invention claimed is:

1. A method of determining a condition of at least one structural part of a working machine, the method comprising:
controlling a position or a state of motion of a first structural part of the working machine in response to a control command provided by a control system of the working machine to (a) move the first structural part, (b) maintain a current position of the first structural part, or (c) maintain a current state of motion of the first structural part, wherein the first structural part is moved by at least one actuator of the working machine,
determining a computational position or state of motion of the first structural part based on the computational model of the working machine,
determining an actual position or state of motion of the first structural part via a hardware sensor, and
determining, via a processor, the condition of the at least one structural part based on the difference between the computational position or state of motion of the first structural part as a result of the controlling and the actual position or state of motion of the first structural part as a result of the controlling,
wherein determining the condition of at least one structural part comprises determining at least one of the following: a clearance of a structural part, a clearance of a joint of two structural parts, a deformation of a structural part, a deformation of a joint of two structural parts, a flex of at least one structural part, a crack in at least one structural part and a leakage of a structural part,
wherein the working machine is a forest machine,
wherein the forest machine is a mobile harvester or mobile forwarder, and
wherein the determining of the condition of at least one structural part is performed while the forest machine is on-site and at work.

2. The method according to claim 1, wherein the controlling of the position or state of motion comprises controlling the first structural part of the working machine to stay in place.

3. The method according to claim 1, wherein the computational model comprises information about at least one of the following: a geometry of the working machine, a weight of at least one structural part of the working machine, and a kinetic model of the working machine.

4. The method according to claim 1, wherein the sensor comprises at least one of the following: an inclinometer, an acceleration sensor, an angular velocity sensor, an angular acceleration sensor, a gyroscope, an inertial measurement unit, a linear position meter, an angular position meter, a joint angle sensor, a position sensor of a pressure medium sensor, a radar and an optical sensor.

5. The method according to claim 1, wherein the at least one structural part the condition is determined for comprises at least one of the following: the first structural part, a second structural part, or a structural part connecting the first and second structural parts to one another.

6. A non-transitory computer readable medium including computer instructions stored therein that, when executed by a processor, cause an arrangement to perform operations corresponding to the method of claim 1.

7. The method according to claim 1, wherein determining the condition is performed during the controlling.

8. The method according to claim 7, wherein one of (a)-(c) is performed.

9. An arrangement configured to determine a condition of at least one structural part of a working machine, wherein the arrangement comprises:
a control system of the working machine, the control system being configured to control a position or a state of motion of a first structural part of the working machine by a control command to (a) move the first structural part, (b) maintain a current position of the first structural part, or (c) maintain a current state of motion of the first structural part by an actuator of the working machine configured to move the first structural part of the working machine,
a sensor configured to determine an actual position or state of motion of the first structural part, and
a processor configured to determine a computational position or state of motion of the first structural part based on the computational model of the working machine and to determine the condition of the at least one structural part based on the difference between the computational position or state of motion of the first structural part as a result of the controlling and the actual position or state of motion of the first structural part as a result of the controlling,
wherein determining the condition of at least one structural part comprises determining at least one of the following: a clearance of a structural part, a clearance of a joint of two structural parts, a deformation of a structural part, a deformation of a joint of two structural parts, a flex of at least one structural part, a crack in at least one structural part and a leakage of a structural part,
wherein the working machine is a forest machine,
wherein the forest machine is a mobile harvester or mobile forwarder, and
wherein the determining of the condition of at least one structural part is performed while the forest machine is on-site and at work.

10. The arrangement according to claim 9, wherein the sensor is fixed to the working machine.

11. The arrangement according to claim 9, wherein the sensor is releasably connectable to the working machine and the processor.

12. The arrangement according to claim 9, wherein the at least one structural part the condition is determined for comprises at least one of the following: the first structural part, a second structural part, or a structural part connecting the first and second structural parts to one another.

13. A working machine comprising the arrangement according to claim 9.

14. The arrangement according to claim 9, wherein determining the condition is performed during the controlling.

* * * * *